United States Patent Office 3,004,916
Patented Oct. 17, 1961

3,004,916
LUBRICATING OIL
Henry R. Ertelt, Fanwood, N.J., assignor to Esso Research and Engineering Company, a corporation of Delaware
No Drawing. Filed Dec. 2, 1957, Ser. No. 699,883
3 Claims. (Cl. 252—32.7)

This invention relates to oil additives and compositions containing said additives. Particularly, it relates to an additive combination which gives outstanding rust and oxidation inhibition, said combination comprising a salt of a non-emulsifying sulfonate, mixed derivatives of diphenyl amine and a metal dihydrocarbyl dithiophosphate. The invention also includes mineral lubricating oil compositions containing said additive materials.

For many industrial applications, it is desirable to have a lubricating oil which is highly resistant to oxidation and which also gives complete protection against rusting of metal parts. Thus, in hydraulic and turbine oils, it is particularly desirable to eliminate the formation of sludge resulting from oxidation of the oil in order to prevent clogging of small diameter feed lines or control mechanisms usually associated with such lubricating systems. Since such lubricants frequently become contaminated by water as by condensation, it is also desirable that the lubricant contain a rust inhibitor to protect the metal surfaces in contact with the lubricant. Moreover, the oil should have little or no tendency to form stable emulsions in order that such water contamination will separate readily from the oil, and preferably such lubricants are resistant to color degradation or sludge formation on exposure to sunlight as in bottle oilers. It has now been found that the combination of a non-emulsifying sulfonate, an amine type inhibitor and a metal dihydrocarbyl dithiophosphate forms an outstanding additive mixture which effectively inhibits oxidation and rusting when used in mineral oil compositions and meets all of the preceding requirements. It has been further found that these three components exhibit a much higher degree of oxidation inhibition than would have been expected from the mere additive effect of each.

The metal component of the metal dihydrocarbyl dithiophosphates are advantageously those metals of group II of Mendeleeff's periodic arrangement of the elements. Included within this group are magnesium, calcium, zinc, strontium, cadmium and barium, which have atomic numbers between 12 and 56. Of these metals, cadmium and zinc are preferred. The hydrocarbyl groups are selected from straight and branched alkyl groups and naphthenyl groups. Alkyl substituents are preferably those containing about 3 to 12 carbon atoms, while the naphthenyl group preferably has 5 to 6 carbon atoms, e.g. cyclohexyl. Mixed materials are also included. Thus, the two alkyl groups in the dialkyl dithiophosphate may be alike or different, or the molecule may contain one alkyl substituent and one naphthenyl substituent. Specific examples of such dithiophosphates include zinc di-n-butyl dithiophosphate, cadmium di-tert.butyl dithiophosphate, magnesium di-isoamyl dithiophosphate, zinc octyl nonyl dithiophosphate, zinc isopropyl isohexyl dithiophosphate, barium dicyclohexyl dithiophosphate, etc.

The non-emulsifying sulfonate of the additive combination is a dinonylnaphthalene sulfonate of the type described in U.S. Patent 2,764,548. This material is a salt such as sodium, potassium, magnesium, barium, zinc, amine or ammonium salts of a dinonylnaphthalene sulfonic acid, the nonyl radicals of which are highly branched, preferably having a tertiary carbon atom. These materials can be prepared as follows: Naphthalene is alkylated with highly branched nonenes, e.g. tripropylene in the presence of a suitable catalyst such as hydrogen fluoride or anhydrous aluminum chloride in an anhydrous solvent such as naphtha. The resulting dinonylnaphthalene dissolved in a solvent which is free of aromatics or olefins, is then sulfonated with concentrated sulfuric acid, e.g. oleum. The sulfonated product is then washed with alkaline water, and the solvent layer containing the water-insoluble sulfonate is then allowed to stratify and the water is drawn off. This procedure may be repeated several times to give a relatively pure product consisting of the sulfonic acid in the hydrocarbon solvent. The sulfonic acid may then be neutralized with a metal base or amine to form the salt. A neutral barium salt of dinonylnaphthalene sulfonate of this general type, commercially available under the trade-name Na-Sul BSN was used in several of the working examples of the invention. It has been found that the above type of sulfonate is distinguishable from the usual synthetic or petroleum sulfonate in that in the concentrations used in this invention it does not promote the formation of emulsions in the presence of water, while at the same time it has been found to be a very effective rust preventive. Instead of nonyl groups, other branched alkyl groups of from 6 to 12 carbon atoms, e.g. isooctyl or isodecyl may be used as substituents on naphthalene within the scope of the present invention.

The mixed derivatives of diphenyl amine are those described and claimed in U.S. Patent 2,530,769. They are a liquid composite product containing a p,p'-dioctyl diphenyl amine, a p'-mono-octyl diphenyl amine, a p-mono-octyl-p'-mono-phenethyl diphenyl amine, a p,p'-diphenethyl diphenyl amine and a p-mono-phenethyl diphenyl amine, in which product there is present from 50 to 70% by weight of the p,p'-disubstituted diphenyl amines and from 30 to 50% by weight of the p-mono-substituted diphenyl amines.

This product is formed by cojointly reacting diisobutylene and styrene with diphenyl amine, in the presence of a Friedel-Craft condensation catalyst such as aluminum chloride. The reaction is carried out by utilizing a weight ratio of diisobutylene to styrene in the hydrocarbon component of the reactants of from 2:1 to 5:1, preferably from 3:1 to 4:1, and a hydrocarbon to diphenyl amine mole ratio of from 1.3:1 to 2:1, preferably from 1.3:1 to 1.5:1. This composite, oil product consists principally of the following compounds:

(1) 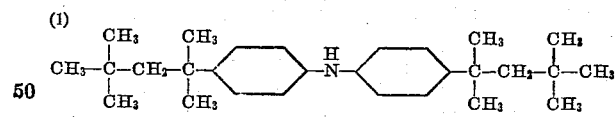

p,p'-di-tertiaryoctyl diphenyl amine

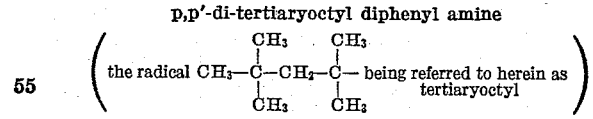

(the radical $CH_3-C(CH_3)_2-CH_2-C(CH_3)_2-$ being referred to herein as tertiaryoctyl)

(2) 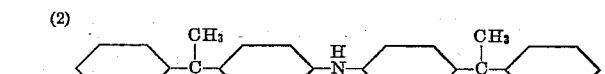

p,p'-di-alpha-phenethyl diphenyl amine (3) 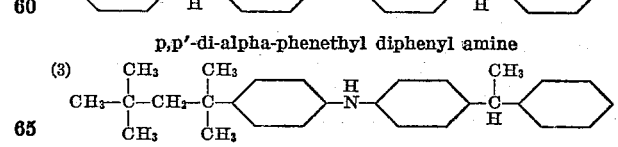

p-mono-tertiaryoctyl-p'-alpha phenethyl diphenyl amine (4) 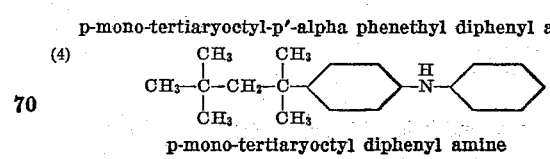

p-mono-tertiaryoctyl diphenyl amine (5) 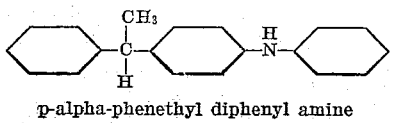

p-alpha-phenethyl diphenyl amine

Compounds 1, 2 and 3 make up from 50% to 70% by weight of the product with Compound 1 being most abundant of these, while Compounds 4 and 5 make up the remaining 30% to 50%, with Compound 4 being more abundant than Compound 5. Such a composite material was used in several examples of the invention and is commercially available under the trade-name "Age-Rite Stalite."

The additive combination of the invention will comprise in a total of 100%, about 10 to 3, e.g. 6–3, wt. percent of the sulfonate, about 80 to 95, e.g. 90 to 94, wt. percent of the amine and about 10 to 2, e.g. 4–3, wt. percent of the dithiophosphate, wherein each additive is considered on an active ingredient basis. On an active ingredient basis the weight ratio of amine to thiophosphate in the additive combination will generally be from about 15/1 to 30/1, preferably from 20/1 to 25/1. On the same basis the weight ratio of sulfonate to thiophosphate will be from about 0.5/1 to 3/1, preferably from about 0.7/1 to 1.5/1. Finished oil compositions will generally contain about 0.2 to 1.5 e.g. 0.3 to 1.0 wt. percent of the additive combination in mineral oil. However, for many purposes, it is preferred to make up concentrates of the additive combination, which concentrate may then be used to form finished oil compositions. Generally, such concentrates will contain on an active ingredient basis about 30 to 90, e.g. 40–60, wt. percent of the additive combination.

Any mineral lubricating oil may be used to form the additive concentrate or the finished lubricant. However, when the ultimate service of the final product is for use as a turbine or a hydraulic oil, it is preferred to use the lighter mineral lubricating oils having viscosities of about 37 to about 150 SUS. at 210° F., e.g. about 40 to about 90 SUS., and viscosity indices of about 80 to about 110, e.g. about 90 to about 100. Such oils may be derived from either paraffinic or naphthenic crudes by any of the refining steps usually employed to prepare lubricating oils.

The invention will be further understood by the following examples:

EXAMPLE I

Various lubricating oil compositions were prepared utilizing a 50% solution in mineral oil of barium dinonyl naphthalene sulfonate (i.e. Na-Sul BSN), the octylated styrenated diphenyl amine previously described (i.e. Age-Rite Stalite) and a 70% solution in mineral oil of a zinc dialkyl dithiophosphate having alkyl groups derived from about 25 wt. percent isopropyl alcohol and 75 wt. percent methyl isobutyl carbinol (available commercially as Lubrizol 1060). Several different mineral oils were used as base oils in preparing the composition of the invention. Base oil 1 was a blend of a paraffinic and naphthenic base stocks, which blend had a V.I. of 99 and a viscosity at 210° F. of 43.6 SUS. Base oil 2 was a somewhat similar blend having a V.I. of 98 and a viscosity at 210° F. of 44.1. Base oil 3 was a mixture of paraffinic and naphthenic base stocks blended to give a V.I. of 97 and a viscosity at 210° F. of 52. The compositions of the invention were prepared by simply mixing the additives into the base oil. The resulting compositions were then tested for oxidation life according to the "Test for Oxidation Characteristics of Inhibited Steam Turbine Oils," ASTM D943–54. Briefly described, this test consists of bubbling oxygen through the test composition maintained at 210° F. in the presence of iron and copper, and then measuring the length of time required until a neutralization number of 2.0 mg. KOH/gm. is reached. This test is well known and is in wide use to determine the degree of degradation of oils by measuring the increase in acidity of the oil due to oxidation. The compositions tested in terms of active additive ingredients and results obtained of the above oxidation test are summarized in the following table:

Table

| Sample | Base Oil | Wt. Percent Additive ||| ASTM D943-54 Oxidation Life (Hrs.) |
| | | Octylated Styrenated Diphenyl Amine | Barium Dinonyl Naphthalene Sulfonate | Zinc Dialkyl Dithiophosphate | |
|---|---|---|---|---|---|
| A | 1 | 0 | 0 | 0 | <100 |
| B | 1 | 0 | 0.025 | 0 | <100 |
| C | 1 | 0 | 0.45 | 0 | <100 |
| D | 1 | 0 | 0.050 | 0 | <100 |
| E | 1 | — | — | 0.5 | <144 |
| F | 1 | 0.40 | 0 | 0 | 1,040 |
| G | 1 | — | .025 | .025 | <144 |
| H | 1 | — | .05 | .05 | <144 |
| I | 1 | — | .05 | .025 | <144 |
| J | 1 | 0.40 | 0 | 0.025 | 1,152 |
| K | 1 | 0.40 | 0.025 | 0.025 | 1,680 |
| L | 2 | 0 | 0 | 0 | <100 |
| M | 2 | 0 | 0.025 | 0 | <100 |
| N | 2 | 0.40 | 0 | 0.025 | [1] <960 |
| O | 2 | 0.40 | 0.025 | 0.025 | 1,305 |
| P | 3 | 0.40 | .025 | .025 | 1,640 |

[1] >790 but <960.

As seen from the data in the preceding table, the sulfonate per se (A to D) has no appreciable oxidation inhibiting effect, and the same is true of the dithiophosphate (E). The amine material does have a pronounced effect as an oxidation inhibitor (F), which is very slightly increased by the addition of the dithiophosphate (J). However, the combination of the amine, sulfonate and dithiophosphate gives a very high oxidation life (K), much higher in fact than would be expected from the mere additive effect of each component. Samples L, M, N and O demonstrate the same effects as the preceding samples, but in a different base oil, while sample P shows the use of a third base oil.

The compositions containing the amine, sulfonate and dithiophosphate (samples K, O, and P) represent balanced oil compositions which pass the ASTM Sea Water Rust Test D665, the ASTM D1401 Emulsion Test, which have good sunlight stability and have unexpectedly long oxidation life.

Several other blends using still other base oils were prepared which contained the amine, sulfonate and dithiophosphate of Example I in the following respective weight percent: 0.6/0.0375/0.06; 0.6/0.0375/0.04 and 0.6/0.0375/0.0375. These latter compositions all demonstrated the excellent properties of samples K, O and P referred to above. Other similar compositions were prepared in which a zinc dialkyl dithiophosphate was used wherein the dialkyl groups both contained six carbon atoms. This material gave the same results as the mixed dialkyl dithiophosphate used in Example I.

In summary, the lubricating oil additive combination of the invention has rust preventive properties but yet does not form emulsions, has sunlight stability, and unexpectedly high resistance to oxidation. The invention resides in the combination of the three types of additives, which combination imparts outstanding oxidation resistance to lubricating oil. The exact nature of each of the additive components is not critical, provided the additives fall within the limits previously set forth. Thus, numerous variations can be obtained in the preparation of both final lubricating compositions and concentrates or additive mixtures. For example, an additive mixture can be prepared by mixing 3 weight percent of the diethyl amine salt of the dinonylnaphthalene sulfonic acid, 95 weight percent of the reaction product of 2 molar proportions of a hydrocarbon mixture containing 3 parts by weight of diisobutylene and 1 part by weight of styrene with one molar proportion of diphenyl amine and 2 weight percent of cadmium dicyclohexane dithiophosphate. Similarly, an additive concentrate can be prepared by adding 50 weight percent of the preceding additive mixture to 50 weight percent oil. This additive concentrate can, of course, upon further dilution be used to form finished lubricants.

What is claimed is:
1. An oil additive combination of (A) about 10 to 3 wt. percent of barium salt of dinonylnaphthalene sulfonic acid, wherein said nonyl groups are branched, (B) about 80 to 95 wt. percent of a material consisting essentially of a mixture of (1) p,p'-di-tetriaryoctyl diphenyl amine, (2) p,p'-di-alphaphenethyl diphenyl amine, (3) p-tertiary-octyl-p'-alphaphenethyl diphenyl amine, (4) p-mono-tertiaryoctyl diphenyl amine and (5) p-mono-alphaphenethyl diphenyl amine in the ratio of 50 to 70% by weight of compounds (1), (2) and (3) to 30 to 50% by weight of compounds (4) and (5), said product resulting from the reaction of 1.3 to 2.0 moles of a hydrocarbon mixture containing about 2 to 5 parts by weight of diisobutylene and one part by weight of styrene, with one mole of diphenyl amine, and (C) about 10 to 12 wt. percent of an oil-soluble zinc dialkyl dithiophosphate, wherein said alkyl groups contain 3 to 12 carbon atoms.

2. A lubricating oil composition comprising a major amount of mineral lubricating oil and about 0.2 to 1.5 wt. percent of the additive combination of claim 1.

3. An oil concentrate comprising mineral lubricating oil and about 60 to 80 wt. percent of the additive combination of claim 1.

References Cited in the file of this patent

UNITED STATES PATENTS

| 2,364,284 | Freuler | Dec. 5, 1944 |
| 2,417,876 | Lewis et al. | Mar. 25, 1947 |
| 2,530,769 | Hollis | Nov. 21, 1950 |
| 2,764,548 | King et al. | Sept. 25, 1956 |
| 2,798,045 | Buck et al. | July 2, 1957 |

FOREIGN PATENTS

| 723,133 | Great Britain | Feb. 2, 1955 |
| 756,523 | Great Britain | Sept. 5, 1956 |
| 125,086 | Australia | Aug. 4, 1947 |

UNITED STATES PATENT OFFICE
CERTIFICATION OF CORRECTION

Patent No. 3,004,916                                      October 17, 1961

Henry R. Ertelt

It is hereby certified that error appears in the above numbered patent requiring correction and that the said Letters Patent should read as corrected below.

Column 4, in the table column 5, line 5 thereof, for "0.5" read -- .05 --; column 5, line 12, for "tetriaryoctyl" read -- tertiaryoctyl --; line 22, for "10 to 12" read -- 10 to 2 --.

Signed and sealed this 17th day of April 1962.

(SEAL)
Attest:

ESTON G. JOHNSON
Attesting Officer

DAVID L. LADD
Commissioner of Patents